(12) United States Patent
Dombek et al.

(10) Patent No.: US 6,619,754 B1
(45) Date of Patent: Sep. 16, 2003

(54) POWER BUGGY

(75) Inventors: Gregory S. Dombek, Germantown, WI (US); Lee J. Weber, Colgate, WI (US); Jeff A. Himmelsbach, Wauwatosa, WI (US)

(73) Assignee: Wacker Corporation, Menomonee Falls, WI (US)

( * ) Notice: Subject to any disclaimer, the term of this patent is extended or adjusted under 35 U.S.C. 154(b) by 0 days.

(21) Appl. No.: 10/043,048

(22) Filed: Jan. 9, 2002

(51) Int. Cl.⁷ .................................................. B60P 1/00
(52) U.S. Cl. ......................... 298/1 C; 298/7; 298/22 R
(58) Field of Search ........................... 298/1 C, 7, 17 R, 298/22 R

(56) References Cited

U.S. PATENT DOCUMENTS

| | | | | |
|---|---|---|---|---|
| 2,887,339 | A | * 5/1959 | Reid | 298/9 |
| 3,292,805 | A | * 12/1966 | Thwaites | 414/498 |
| 3,584,749 | A | * 6/1971 | Parello | 414/343 |
| 3,938,216 | A | * 2/1976 | Schmitz et al. | 15/340.2 |
| 4,207,022 | A | * 6/1980 | Castel | 414/685 |
| RE33,131 | E | * 12/1989 | Morrison | 298/1 H |
| 5,174,115 | A | * 12/1992 | Jacobson et al. | 60/484 |
| 5,360,259 | A | * 11/1994 | Lemberger | 298/19 V |
| D410,313 | S | 5/1999 | Dombek et al. | D34/19 |
| 6,155,648 | A | * 12/2000 | Dombek et al. | 298/1 C |
| 6,322,151 | B2 | * 11/2001 | Dombek et al. | 298/1 C |
| 2001/0000641 | A1 | * 5/2001 | Dombek et al. | 298/7 |

OTHER PUBLICATIONS

Miller Scoot–Crete brochure, pp. 2–7, (undated).
Whiteman Industries Inc., Power Buggy brochure (undated).
Morrison, *Hydraulic Power Buggies* Brochure, Pub. #372 (undated).
Eaton Company, Eaton New Zealand, http://www.eaton.co.nz/Pumps/pistonpumps.htm, pps. 1–9 (Nov. 15, 2001).
Schroeder Industries, *The Wheel–Burro™ from Schroeder Industries*, Specification Sheet L–2384 (1/97).

* cited by examiner

*Primary Examiner*—Joseph D. Pape
*Assistant Examiner*—Paul Chenevert
(74) *Attorney, Agent, or Firm*—Boyle Fredrickson Newholm Stein & Gratz S.C.

(57) ABSTRACT

A power buggy is configured to be safe, stable, easy to control, and comfortable. Frequently-used controls, such as a dump control, a kill switch, and a directional control, are located at or very near handgrips of an operator's handle so as to permit the operator to control the vehicle without releasing either of the handgrips. The power buggy comprises a plurality of wheels and a movable chassis which is supported on the wheels and which has front and rear end portions. A dumpable article support is supported on the front end portion of the chassis. The power buggy also includes an axial piston hydrostatic pump assembly that has an axial piston pump which supplies power to the wheels and a second pump which charges a hydraulic system of the power buggy.

20 Claims, 6 Drawing Sheets

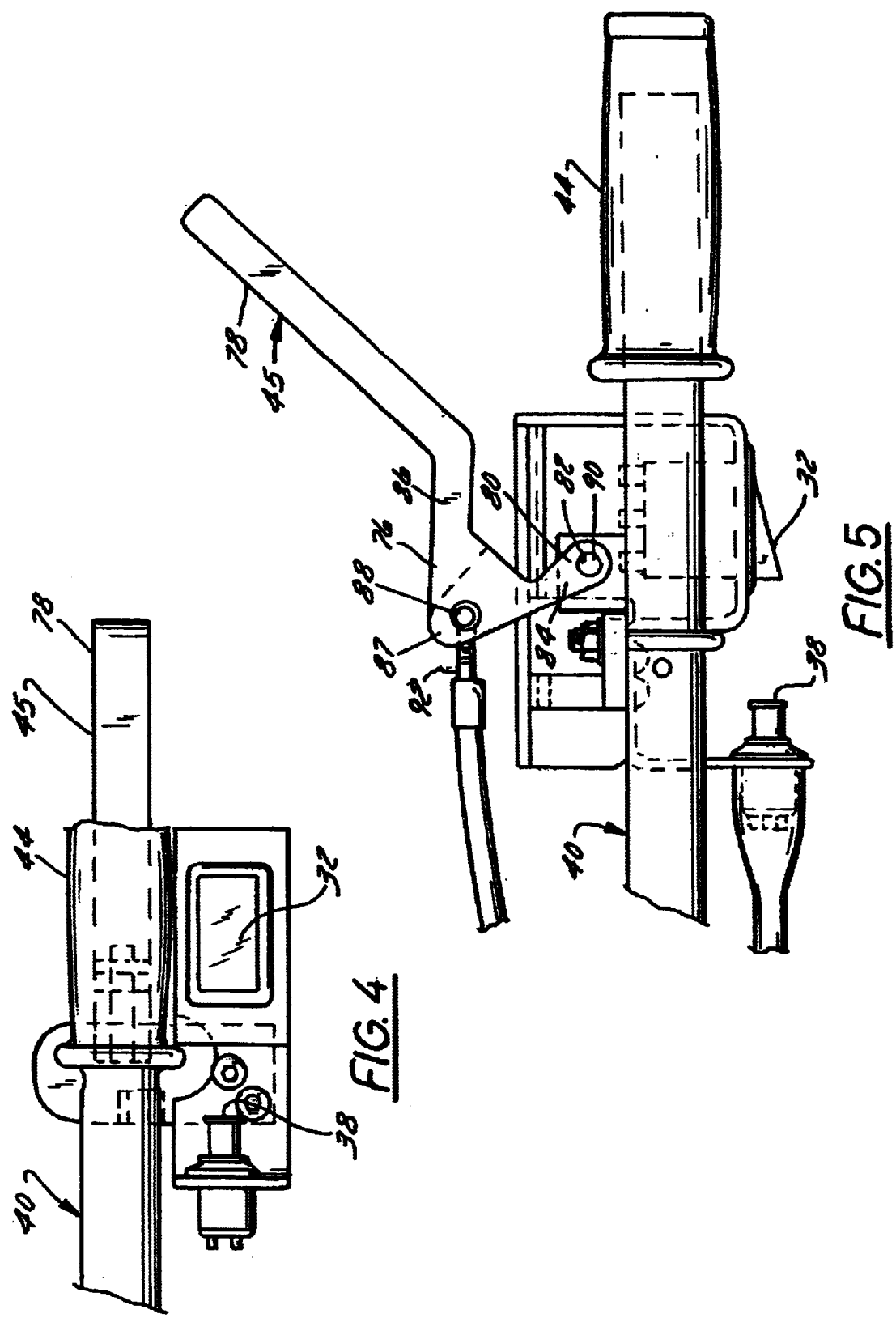

POWER BUGGY

BACKGROUND OF THE INVENTION

1. Field of the Invention

The invention relates to load hauling machines and, more particularly, relates to a "power buggy," i.e., a relatively small, self-propelled load hauling vehicle having a storage bucket and operator's controls. The invention additionally relates to a power buggy designed to maximize operator safety, stability, and comfort.

2. Discussion of the Related Art

Power buggies are well-known light industrial vehicles designed to haul loads of from a few hundred pounds to a few tons. The typical power buggy comprises 1) a chassis supported on the ground via a plurality of wheels, 2) a storage bucket or dumping platform supported on the front end of the chassis and liftable to dump loads, and 3) a power source for propelling the vehicle and for operating other powered equipment on the vehicle. The typical power buggy is controlled by an operator who is stationed behind the power buggy and who either walks behind the power buggy or stands on an operator's platform mounted on the rear end of the chassis.

Controls for the typical power buggy include a steering control mechanism, a speed control mechanism, an engine kill switch or similar controller, and dump controls which raise and lower the bucket to dump hauled articles. The vehicle is steered by a generally Y-shaped handlebar having a pair of handgrips. Vehicle propulsion is controlled by a squeeze lever mounted adjacent one of the handgrips. Power buggies of this general type are available from Miller, the Morrison Division of Amida Industries, Inc., the Whiteman Division of Amida Industries, Inc., and Schroeder Industries.

The typical power buggy has several disadvantages impairing operator comfort and even risking operator injury.

For instance, the controls of the typical power buggy are inconveniently located and/or difficult to operate. As an example, the squeeze lever used for speed control operates on generally the same principle as a motorcycle hand brake to the extent that the operator must simultaneously grasp the handgrip and pull a spring-loaded lever towards the handgrip. The vehicle is propelled at a speed proportional to the amount of force applied to the squeeze lever. The squeezing action on conventional buggies is somewhat difficult for the operator, and prolonged operation of the squeeze lever can result in operator hand fatigue.

Additionally, conventional power buggies use a radial ball-type piston pump, such as the Eaton pump Model 1120 used in the Whiteman power buggy. The typical radial ball-type piston pump provides undesired feedback to the squeeze lever that increases with increased load. For example, as the pressure increases when, e.g., the power buggy climbs a hill, the internal pressure built in the pump rises and opposes the actuating force imposed on the pump's swash plate, tending to re-center the swash plate. These conditions increase resistance to squeeze lever movement, hence raising the operating forces required for squeeze lever operation. This requirement for an increased amount of force accelerates operator fatigue. Furthermore, a radial ball-type piston pump can free wheel, leading a potential runaway condition when the buggy is traveling downhill.

In conventional power buggies, directional control, i.e., shifting between forward and reverse, is effected by way of a separate shift control lever located remote from the squeeze lever. The operator must release one of the handgrips to shift between forward and reverse with resultant risk of loss of vehicle control. This risk is heightened by the fact that speed control and directional control are independent. It is therefore possible for an operator to shift the vehicle while still actuating a squeeze lever, in which case the vehicle reverses its direction of travel abruptly, thereby potentially causing the operator to lose his/her balance.

Conventional directional control levers used in power buggies include three positions: forward, reverse, and neutral, with the neutral position being located between the forward and reverse. In switching from forward to reverse, the lever must travel through neutral. While the lever is in neutral, the power buggy can freely move. If the power buggy is on an incline while in neutral, the power buggy can uncontrollably roll, a problem that is further troublesome when the buggy is loaded.

In some power buggies, as the unit picks up speed when the vehicle is rolling down a hill under power, the hydraulic motors for the wheels are accelerated by the wheels. Above a certain speed, the motors, in effect, turn into pumps that can overpower the pump, leading to a runaway condition. If the operator tries to regain control by reversing the flow of hydraulic fluid to the wheel drive motors, the machine may flip over.

Another drawback to conventional directional controls is that a manual lever controls a manual valve to change directions. The manual lever and manual valve require substantial operator force to operate, also contributing to operator fatigue.

Some of these problems are exacerbated by the fact that other controls are similarly relatively inaccessible and/or hard to operate. For instance, dump controls typically take the form of hand-operated levers which are spaced a substantial distance from the handgrips and which therefore require the release of one of the handgrips for their operation. Some power buggies attempt to alleviate this problem by supplementing the hand levers with redundant foot levers. However, operating the foot levers requires the shifting of the operator's weight to one foot with risk of loss of balance.

All of these factors conspire to render the power buggy relatively difficult. At the very least, the operator risks substantial discomfort in operating the machine.

Some power buggies have a hydraulic pump cooling fan to cool the pump because the pump is underrated for use with a power buggy and, accordingly, is routinely worked hard enough to require cooling via a cooling fan. Cooling fan failures are commonplace. Moreover, installation of the cooling fan on the power buggy requires additional assembly steps to align the gasoline motor and the hydraulic pump. In such a conventional buggy, the motor and pump, each of which had a shaft, were hard mounted to a mounting plate, which required almost perfect alignment of the two shafts.

The need therefore has arisen to provide a power buggy that can be operated easily, safely, and comfortably while at the same time maximizing vehicle stability.

SUMMARY OF THE INVENTION

A power buggy is provided that comprises a plurality of wheels and a movable chassis which is supported on the wheels and which has front and rear end portions. A dumpable article support is supported on the front end portion of the chassis. Also included in the power buggy is a pump assembly that has an axial piston hydrostatic pump which supplies power to the wheels and a second pump which charges a hydraulic system of the power buggy. The power buggy also includes an operator's handle that includes first and second handgrips designed to be grasped by an operator's hands.

A bucket dump control switch arrangement, a kill switch, and a directional control switch preferably are located at least in the vicinity of one of the handgrips so as to permit the operator to effect directional control, speed control, and bucket dumping control while holding onto both of the handgrips.

The handle preferably also includes a squeeze lever that has a lever portion and a pivot portion. The pivot portion includes (a) a free end that is pivotally mounted on a handgrip of the power buggy, and (b) first and second legs that extend at converging angles from the free end and the lever portion, respectively, and that are joined to one another at a corner of the pivot portion. The pivot portion also includes a cable mount that is spaced from the free end and from the lever portion. Actuation of the squeeze lever propels the power buggy at a speed that is dependent upon the magnitude of squeeze lever pivoting.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 4 is a top plan view corresponding to FIG. 3;

FIG. 5 is an elevation view of the controls of FIG. 4, including and a handgrip and a squeeze lever of the power buggy, showing the squeeze lever in an unactuated position;

DETAILED DESCRIPTION OF THE PREFERRED EMBODIMENTS

1. Resume

Pursuant to the invention, a power buggy is provided that is safe, stable, easy to control, and comfortable to operate. The power buggy is controlled via operation of an operator's handle that includes handgrips and a squeeze lever. Frequently-used controls such as dump controls, a kill switch, and a directional control, are located at or very near the handgrips of the operator's handle so as to permit the operator to control the machine without releasing either of the handgrips. The directional control is an electric switch, which requires less force to operate than a manual lever. The switch preferably (but not necessarily) is a two-position switch lacking a neutral position. The switch controls operation of an axial piston hydrostatic pump that is an industrial caliber pump that 1) does not require a pump cooling fan and 2) does not produce feedback. The pump, in combination with a unique-geometry squeeze lever, considerably reduces the forces required to actuate the squeeze lever and prevents free-wheeling.

2. Power Buggy Overview

Figure 1:
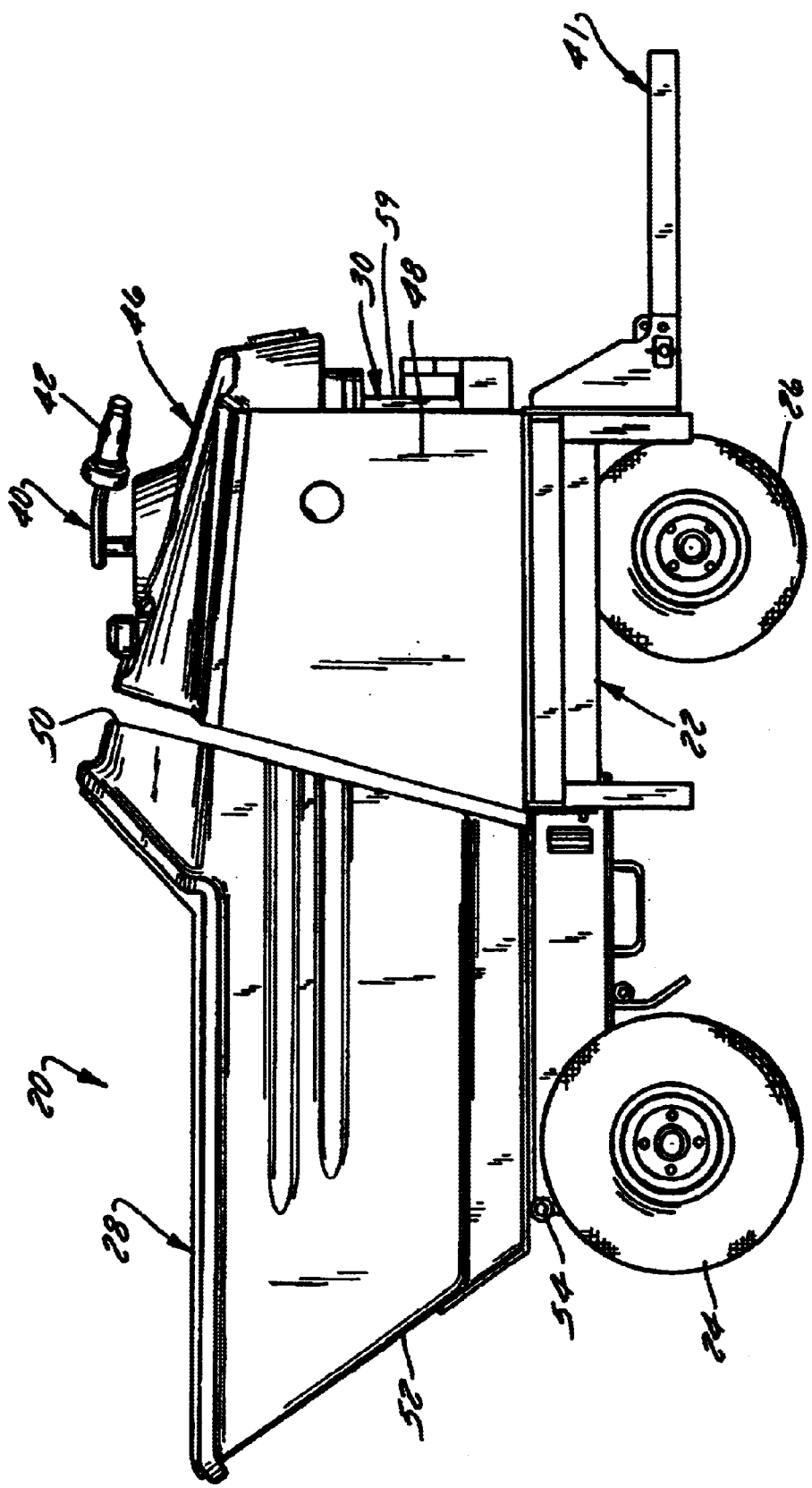
FIG. 1 is a side elevation view of a power buggy constructed in accordance with a preferred embodiment of the invention.
Figure 2:
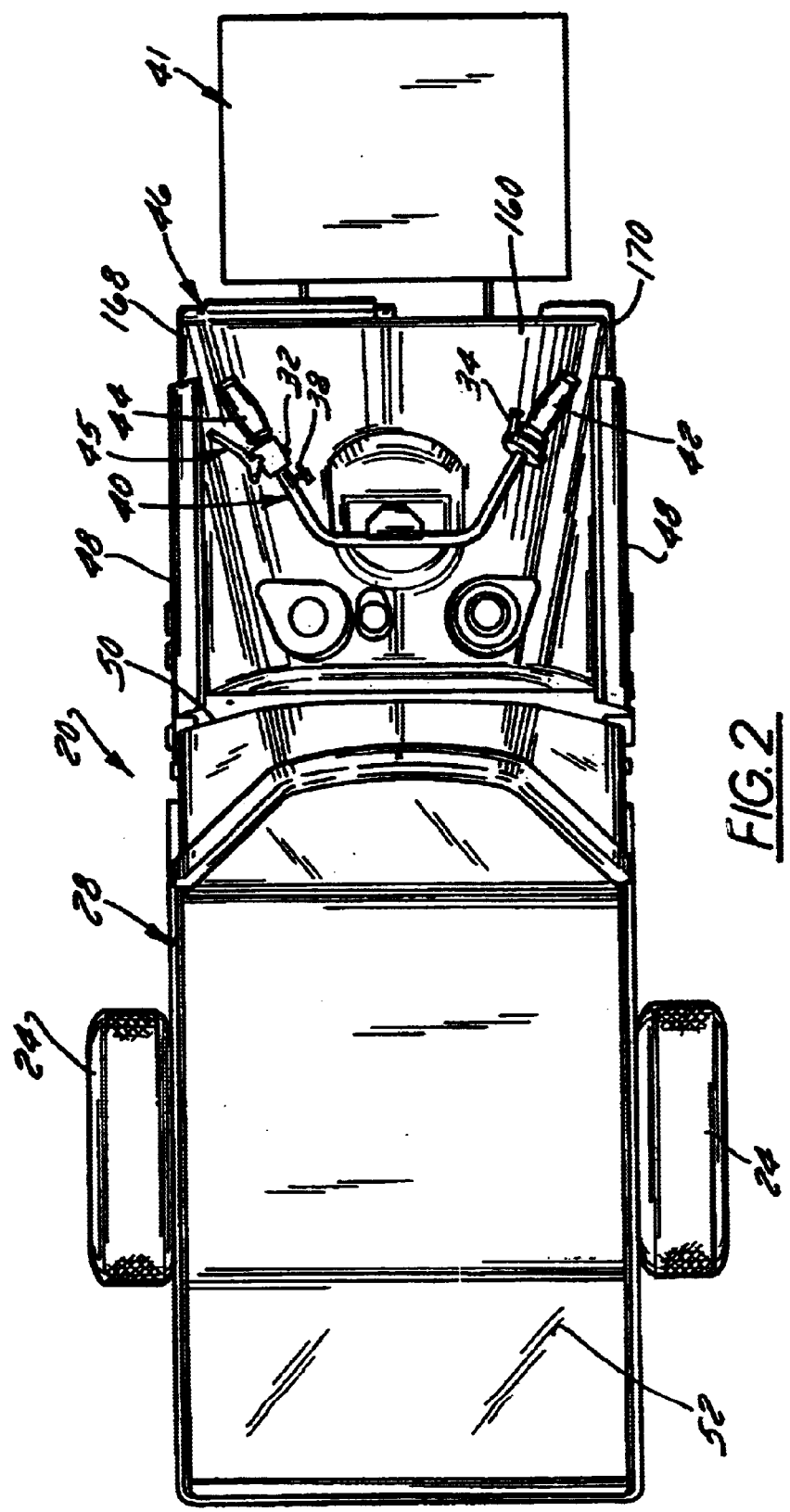
FIG. 2 is a top plan view of the power buggy.

Referring initially to FIGS. 1–2, a power buggy 20 is illustrated that is designed to haul loads over relatively short distances at construction sites and the like and to dump those loads at desired locations. The major components of the power buggy include 1) a chassis 22 supported on front and rear wheels 24 and 26, 2) a dumpable article support 28 that is supported on the chassis 22 and that can be selectively raised and lowered to dump loads stored therein, 3) a motive power source 30, 4) operator's controls 32, 34, and 5) an operator's platform 41.

The chassis 22 may comprise any suitable metal frame supported on wheels or rollers. In the present case, the chassis is supported on front and rear wheels 24 and 26. The front wheels 24 are driven by the motive power source 30. The rear wheels 26 are steered using a steering handle 40 having a left handgrip 42 and a right handgrip 44. The motive power source 30 and other covered components of the vehicle 20 are bounded from above by a fuel tank 46 and from the sides by side shrouds 48. The side shrouds 48 are attached to the fuel tank 46 at their upper ends and are attached to the chassis at their lower ends in a conventional manner. A front shroud (not shown) typically also will be connected at its ends to the side shrouds 48 and at its top to the fuel tank 46.

The dumpable article support 28 may comprise any structure which is capable of supporting articles and of being raised and lowered to selectively dump articles stored therein or thereon. For instance, the article support 28 may comprise a platform. In the illustrated embodiment, the article support 28 comprises a bucket, so the terms "dumpable article support" and "bucket" will be used interchangeably for the sake of convenience. The bucket comprises a plastic storage bucket 28 having a maximum capacity of 2500 pounds. The bucket 28 has a front wall 52 which is relatively low and which is sloped to facilitate dumping. The bucket 28 also has a rear wall 50 which is relatively high so as to enhance load carrying capacity and bucket aesthetics. The raised area also functions as a splash guard to keep concrete off of the fuel tank or from splashing into the engine compartment through the vented front plate. The front end of the bucket 28 is pivotally mounted on the chassis 22 via a pivot shaft 54. A double acting hydraulic dump cylinder 56 (FIG. 7) has a barrel end 55 attached to the chassis 22 and a rod end 57 attached to a bracket (not shown) mounted on a laterally-central portion of a bottom surface of the bucket 28 in the vicinity of the rear end of the bucket 28. Cylinder extension pivots the bucket 28 about the shaft 54 to dump loads.

The motive power source 30 preferably comprises 1) an internal combustion engine 59 (FIG. 1) and 2) a pump assembly 60 (FIG. 7) that is powered by the engine to supply pressurized hydraulic fluid to hydraulic motors 64 and 64' for the front wheels 24. The pump assembly 60 is detailed in Section 4 below. The engine 59 preferably is a relatively small four-stroke engine of about 10–15 horsepower. The engine 59 also supplies electrical power to the various electric components of the vehicle 20 by way of an AC charge coil (not shown) and a DC converter (not shown). The AC charge coil and DC converter eliminate the need for a battery, thereby reducing the complexity and weight of the power buggy 20.

As discussed briefly above, the operator's controls 32, 34, and 38, pump assembly 60, and squeeze lever 45 are designed to maximize operator comfort and safety and to achieve other benefits. Each of these components will be detailed in turn.

3. Operator's Controls

Figure 3:
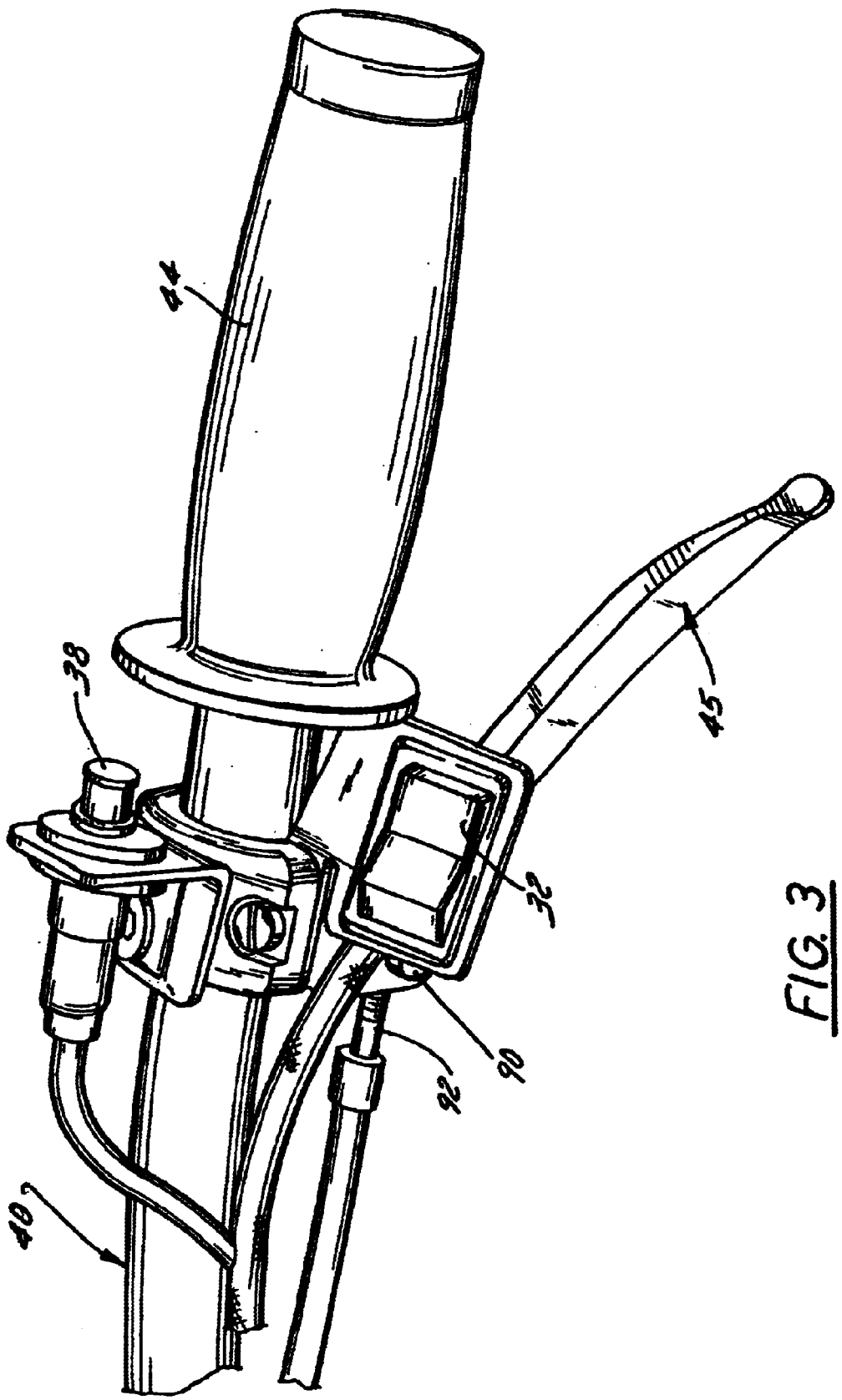
FIG. 3 is a perspective view the right handgrip of the power buggy and associate controls.

Referring particularly to FIG. 3, all primary vehicle functions are controlled from locations at or very near the handgrips 42 and 44 so that the operator can operate the vehicle 20 without releasing either handgrip. Specifically, a directional control switch 32, used to shift from forward to reverse, is mounted adjacent the right handgrip 44. Bucket dumping is controlled by a dump control switch 34 (FIG. 2) mounted adjacent the left handgrip 42. Engine shutoff is controlled by a conventional kill switch 38 mounted adjacent the right handgrip 44. Vehicle speed is controlled by a squeeze lever 45 located adjacent the right handgrip 44. While the kill switch 38 and bucket dumping switch 34 are conventional in design but not in placement, the directional control switch 32 and squeeze lever 45 are nonconventional. The switch 32 and lever 45 will now be described.

As can best be seen in FIGS. 3 and 5, the directional control switch 32 is an electric switch that requires far less force to operate than is required for conventional, manual directional control switches. The directional control switch 32 controls the supply of electric power to a valve 72 (FIG. 7), which is controlled by a single solenoid 74 and which is described in detail below, so that activation of the directional control switch 32 changes direction of the power buggy 20. The switch 32 of the preferred embodiment is a two-position rocker switch 32 that can be toggled between a forward "F" position and a reverse "R" position. Depression of the switch 32 to the "F" position does not energize the solenoid 74. When the solenoid 74 is deenergized, the power buggy 20 moves in a forward direction when the squeeze lever 45 is actuated. Depression of the switch 32 to the "R" position energizes the solenoid 74 to reverse the direction of the power buggy 20 when the squeeze lever 45 is actuated. Unlike conventional directional control levers used on power buggies, the two-position directional control switch 32 lacks a third, neutral position. Eliminating the neutral position, though not critical to the invention, helps prevent the power buggy 20 from free-wheeling on inclines. (As discussed in more detail below, free-wheeling is further prevented through the use of the specific pump assembly 60 and its related components). This significantly improves operator safety, particularly when the power buggy 20 is filled with a load, such as bricks, rocks or other heavy material and the power buggy 20 is on a steep incline.

The squeeze lever 45 controls the speed of the power buggy 20 on generally the same principle as a motorcycle hand brake to the extent that the operator must simultaneously grasp the handgrip and pull a spring-loaded lever towards the handgrip. The vehicle 20 is propelled at a speed proportional to the amount of force applied to the squeeze lever 45. The squeeze lever 45 is specially configured to reduce the required actuating forces and to reduce operator fatigue. Referring now to FIGS. 3–6, the squeeze lever 45 is mounted adjacent the right handgrip 44 so as to be actuatable by the operator's right hand when holding onto the handgrip 44. The squeeze lever 45 includes a generally triangular pivot portion 76 that is disposed in front of the handgrip 44 and an elongated lever portion 78 that extends over the handgrip 44. A free end 80 of the pivot portion 76 has holes 82 or another mount formed therein or thereon for pivotally mounting the squeeze lever 45 on a pivot mount 90 of the handle 40 adjacent the end of the handgrip 44. The pivot portion 76 additionally includes first and second legs 84 and 86 that extend at converging angles from the free end 80 and the lever portion 78, respectively, and that are joined to one another at a corner 87 of the pivot portion 76. A bore 88 is formed in the corner at a location that is offset from the center of the pivot portion 76. The bore 88 receives the end of a cable 92 that is coupled to a swash plate (not shown) of the pump assembly 60 so as to vary the output of the pump assembly 60 and, thereby, vary the power supply to hydraulic motors 64 and 64' (FIG. 7) upon squeeze lever 45 actuation. The lever portion 78 extends rearwardly from a rear end of the pivot portion 76 along a line that contains or is at least adjacent to the pivot holes 82. In the illustrated embodiment:

- the first and second legs 84 and 86 of the pivot portion 76 extend at angles of about 65° and 130°, respectively, from the lever portion 78;
- the cable mounting bore 88 is spaced from the pivot mount 90 by about 1.5";
- the lever portion 78 is about 4" long; and
- the entire squeeze lever 45, measured from the pivot mount 90 to the end of the lever portion 78, is about 6" long.

Dimensions of an especially preferred embodiment are summarized in the following table, which also lists the corresponding dimensions for the more difficult to operate squeeze lever employed by the Whiteman power buggy described in the Background Section above:

TABLE 1

| | Wacker[1] | Whiteman[2] |
|---|---|---|
| Distance from cable mounting bore to end of lever portion | 5.5" | 9.25" |
| Distance from cable mounting bore to midpoint of lever portion | 3.45" | 6.125" |
| Distance between pivot mount to cable mounting bore in second corner | 1.5" | 2.68" |
| Distance between pivot mount to handgrip | 0.425" | .0625" |
| Diameter of handgrip | 0.875" | 1.0625" |
| Distance between midpoint of lever portion (at edge of squeeze lever that is closest to handgrip) to handgrip | 2.4" | 2.5" |
| Distance between endpoint of lever portion (at edge of squeeze lever that is closest to handgrip) to handgrip | 4.2" | 3.5" |

[1]Wacker WB16
[2]Whiteman WBH-16E

Figure 6:
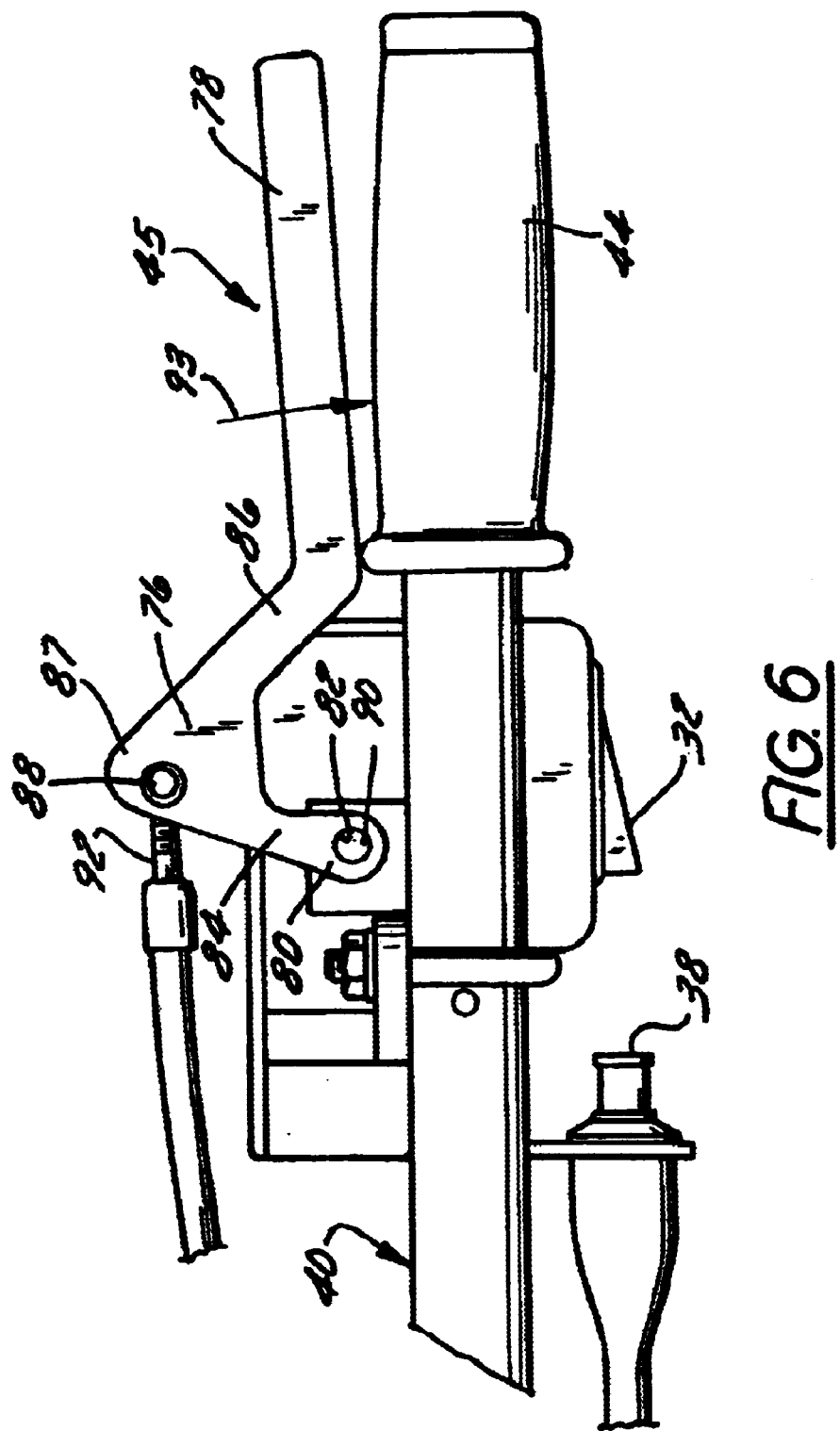
FIG. 6 is an elevation view corresponding to FIG. 5 and showing the squeeze lever in an actuated position.

In its deactuated state, which is illustrated in FIG. 5, the lever portion 78 extends generally transversely to the handgrip 44 and is at a position normally below the handgrip 44. When the squeeze lever 45 is forced toward the handgrip 44, as is shown in FIG. 6, the squeeze lever 45 pivots about the pivot mount 90 to cause the pivot portion 76 to swing in the direction of the arrow 93 in FIG. 6 to extend the cable 92, thereby moving the swash plate of the pump assembly 60.

With conventional squeeze levers, the squeezing action is somewhat difficult for the operator, and prolonged operation of the squeeze lever can result in operator hand fatigue. That fatigue can be dramatically reduced when using the squeeze lever 45 in combination with the pump assembly 60, which will now be detailed.

Figure 7:
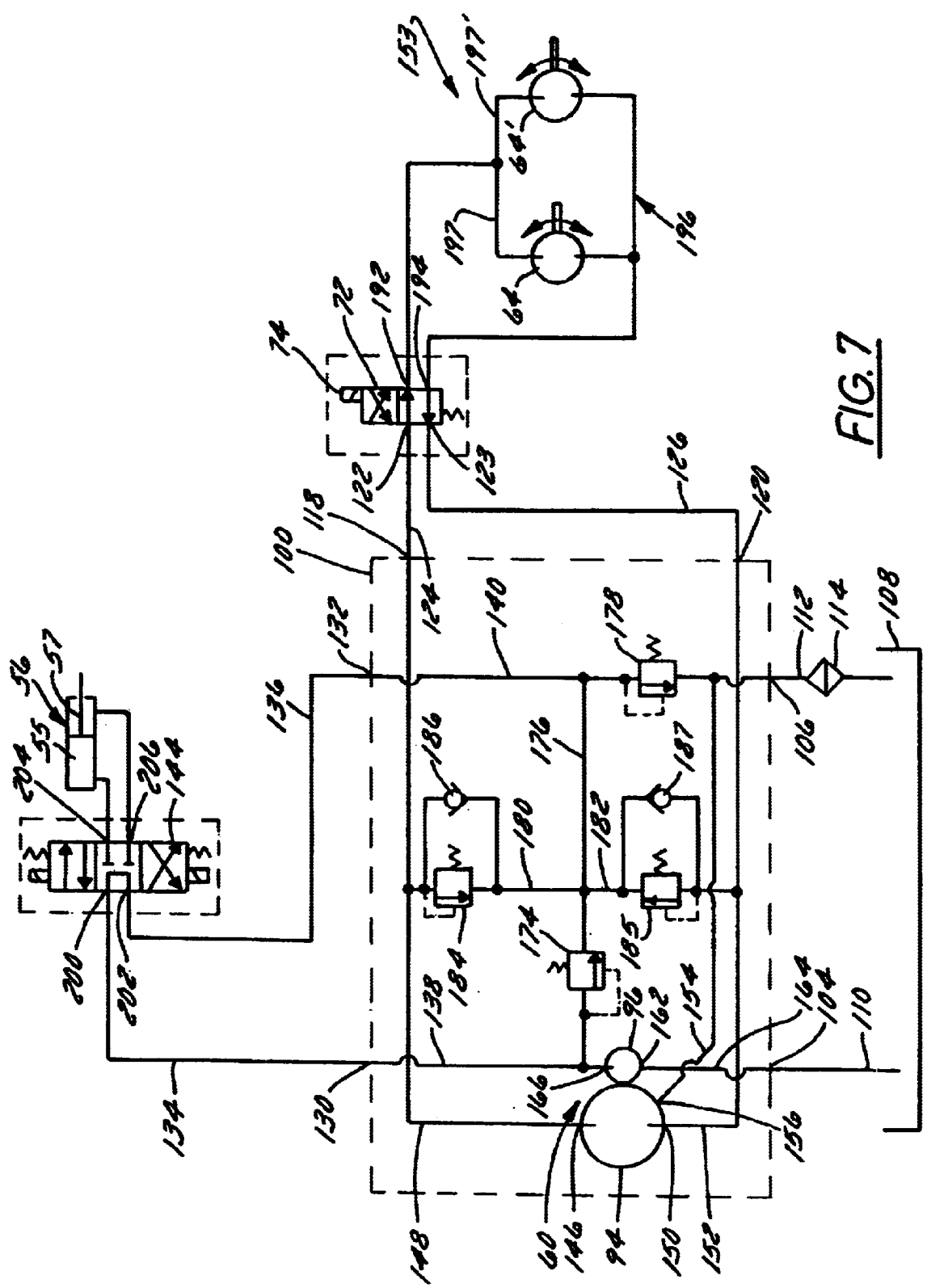
FIG. 7 is a hydraulic circuit schematic, showing the internal hydraulic circuitry of the power buggy.

Referring now to FIG. 7, the pump assembly 60 includes o internal pumps: 1) an axial piston hydrostatic pump 94 and 2) a charge pump 96. The pump 94 supplies pressurized hydraulic fluid to hydraulic motors 64 and 64' for the powered front wheels 24 of the power buggy 20. The charge pump 96 charges the system with hydraulic fluid and also runs the auxiliary systems such as the dump cylinder 56 and possible other components of the power buggy 20. The axial piston hydrostatic pump 94 is an industrial caliber pump that does not require a pump cooling fan when used on a power buggy 20. In contrast, conventional radial ball type-piston pumps used on power buggies are far less efficient than axial piston pumps and, accordingly require a pump cooling fan when used on a power buggy. The pump assembly 60 mounts as a unit to a bell housing (not shown) of the vehicle 20 that bolts directly to the face of the engine 59. The input shaft (not shown) of the pump assembly 60 therefore can be coupled directly to the output shaft (not shown) of the engine 59 via a simple love joy coupling or the like. The pump assembly and engine 59 therefore are mounted as one unit and share a common shaft. This eliminate the requirement for precise alignment of a separate engine shaft and a pump shaft, as was necessary with conventional power buggies. A preferred pump assembly 60 having these characteristics is a model PVWC pump from Oilgear Company, Milwaukee, Wis.

The pump assembly 60 and related system components are schematically illustrated in FIG. 7. The pump assembly 60 is contained in a pump casing designated generally at 100. The casing 100 has three sets of inlet and return ports. The first set includes low pressure supply and return ports 104 and 106 connected to a reservoir 108 by low pressure supply and return lines 110 and 112. A filter 114 is positioned in the return line 112. The second set comprises main supply and return ports 118 and 120 connected to respective ports 122 and 123 of the directional control valve 72 by respective main supply and return lines 124 and 126. The third set comprises auxiliary supply and return ports 130 and 132 that circulate pressurized fluid through auxiliary equipment via auxiliary supply and return lines 134 and 136. The auxiliary supply port 130 receives fluid from an internal auxiliary supply passage 138, and the auxiliary return port 132 is coupled to the low pressure return port 106 by a drain passage 140 in the casing 100. In the illustrated embodiment, the auxiliary equipment comprises a dump valve 144 that controls operation of the dump cylinder 56 under control of the dump switch arrangement 34.

Still referring to FIG. 7, the axial piston pump 94 has an outlet port 146 that is connected to a main supply passage in the casing 100, and an inlet port 150 that is connected to a main return passage 152. The main supply passage 148 leads to the main supply port 118, and the main return passage 152 leads to the main return port 120. Hence, the pump 94 continuously circulates fluid, at a pressure determined by the setting of the pump's swash plate (not shown), from the main supply port 118, through a wheel drive assembly 153 as detailed below, and back to the pump inlet port 150 through the main return port 120 and the return main return passage 152. Any internal leakage in the pump 94 is accommodated by a bleed passage 154 that leads from a bleed port 156 on the pump 94 to the drain passage 140.

The charge pump 96 is configured to supply pressurized hydraulic fluid to the auxiliary components and to supply make-up fluid to the axial piston pump 94. With continued reference to FIG. 7, the charge pump has 1) an inlet 162 connected to the low pressure supply port 104 by an internal pressurized passage 164 and, 2) an outlet 166 connected to the auxiliary supply port 130 by the internal auxiliary supply passage 138. The outlet pressure of the charge pump 96 is maintained by first and second relief valves disposed in a flow path coupling the pump outlet 166 to the low pressure return port 106. Specifically, a high pressure relief valve 174 is provided in a charge passage 176 connecting the auxiliary supply passage 138 to the drain passage 140, and a low pressure relief valve 178 is provided in the drain passage 140 downstream of the junction between the charge passage 176 and the drain passage 140. The charge passage 176 also is connected to the main supply and return passages 148 and 152 by respective branch passages 180 and 182, each of which has a relief valve 184 and 185, respectively, and a parallel check valve 186 and 187, respectively, located therein. This arrangement permits make-up fluid, supplied at a pressure determined by the relief valves 174 and 178, to flow into the main supply and/or return passages 148 and 152 from the charge passage 176 via the branch passages 180 and/or 182 and associated check valve(s) 186 and/or 187. This might be necessary when, for example, hydraulic fluid is lost via the bleed passage 154. Overpressure in the main supply and/or return passage(s) 124 and 126 is relieved via the operation of the relief valve(s) 184 and/or 185.

Still referring to FIG. 7, the directional control valve 72 is configured to control the direction of flow of the hydraulic fluid between the drive motors 64 and 64' and the main supply and return ports 118 and 120. The valve 72 is a two-way, two position solenoid valve having the inlet port 122 connected to the main supply line 124, and the return port 123 connected to the main return line 126. Outlets 192 and 194 are connected to a drive wheel circuit 196 having two wheel drive hydraulic motors 64 and 64' disposed therein in parallel branch lines 197 and 197', respectively, of the circuit. The direction of motor rotation and, accordingly, the direction of driven wheel rotation, are controlled by selectively electrically switching the valve 72. Specifically, the valve 72 has only a single solenoid 74 and, accordingly, is retained in the illustrated "FORWARD" position in the absence of an energizing signal. It is selectively switched to the non-illustrated "REVERSE" position when its solenoid 74 receives energizing current under actuation of the directional control switch 32, discussed above. Specifically, when the solenoid 74 is not energized and the valve 72 assumes the illustrated FORWARD position, hydraulic fluid flows clockwise through the drive wheel circuit 196 to drive the front wheels 24 to rotate in a forward direction. When the solenoid 74 is energized to switch the valve 72 to its REVERSE position, the direction of the hydraulic fluid flow through the drive motors reverses, driving the front wheels 24 to rotate in a reverse direction.

As discussed briefly above, fluid flow between the auxiliary supply and return ports 130 and 132 and the dump cylinder 56 is controlled by a three-position dump solenoid valve 144 with a neutral position, a first position, and a second position. The dump valve 144 has an inlet port 200 connected to the auxiliary supply line 134, a return port 202 connected to the auxiliary return line 136, and first and second outlet ports 204 and 206. When the dump valve 144 is in a neutral position, hydraulic fluid does not flow to or from the cylinder 56. When the dump valve 144 is switched to the first position by operation of the dump switch 34, the first and second outlet ports 204 and 206 are coupled to the cylinder and rod ends 55 and 57, respectively, of the cylinder 56. In this position, hydraulic fluid flows from the inlet port 200 to the barrel end 55 of the cylinder 56, and hydraulic fluid flows from the rod end 57 of the cylinder 56, through the second outlet port, 206 and out of the return port 202. As result, the cylinder 56 is extended to raise the bucket 28. When the dump valve 144 is placed in the second position by operation of the dump switch 34, the first and second outlet ports 204 and 206 are coupled to the rod and barrel ends 57 and 55, respectively, of the cylinder 56. In this position, hydraulic fluid flows from the inlet port 200 to the rod end 57 of the cylinder 56, and hydraulic fluid flows from the barrel end 55 of the cylinder 56, through the outlet port 206, and out of the return port 202. As a result, the cylinder 56 is retracted to lower the bucket 28.

The pump assembly 60 is much more efficient than previous pumps used on power buggies. It therefore runs relatively cool, permitting the elimination of a pump fan. Furthermore, with the pump assembly 60, the operator does not experience negative feedback to the squeeze lever 45, as was the case for pumps used in previous power buggies. In contrast to radial ball-type piston pumps used in conventional power buggies that exhibit increasing actuation resistance as the pump load increases, pump assembly 60 exhibits a constant resistance at a much lower level regardless of the pump load. These characteristics, and the above-described beneficial characteristics of the squeeze lever 45, conspire to dramatically reduce the forces required to operate the squeeze lever 45 and to maintain the squeeze lever in its actuated position. These effects, and the isolation of the squeeze lever 45 from feedback from the pump assembly 60, can best be demonstrated by comparing the actuating forces required of a power buggy 20 in accordance with the invention to a squeeze lever of the Whiteman power buggy described in the Background section of this application. That comparison is summarized in Table 2 and is believed to be self-explanatory.

TABLE 2

SQUEEZE LEVER/CABLE PULL FORCES

| | (lbs) | WB 16[1] | WM[2] | Force Reduction |
|---|---|---|---|---|
| Engine off/squeeze lever tested | | | | |
| Measurements taken at mid grip area and at end of grip. | MID= | 14.2 | 21.0 | 32% |
| | END= | 9.5 | 15.5 | 39% |
| Engine off/cable pull tested | | 31.5 | 44.5 | 29% |
| Engine running/squeeze lever tested | | | | |
| Measurements taken mid grip area and at end of grip. | MID= | 8.5 | 18.0 | 53% |
| Measurements taken with buggy suspended. | END= | 6.0 | 13.00 | 54% |
| Engine running/cable pull tested | | | | |
| Measurements taken with buggy suspended, no resistance to drive system. | Forward= | 19.0 | 37.0 | 49% |
| | Reverse= | 19.2 | 38.0 | 49% |
| Measurements taken with buggy suspended, parking brake applied. | Forward= | 22.0 | 57.0 | 61% |
| | Reverse= | 21.0 | 58.0 | 64% |

[1]Wacker WB16
[2]Whiteman WBH-16E

The last column of Table 2 reveals that the geometry of the squeeze lever 45, along with advantages provided through use of the pump assembly 60, provides a squeeze lever 45 that requires far less actuating force from an operator of the power buggy 20 than a conventional squeeze lever on a power buggy 20.

In addition, due to factors including a relatively high charge pressure and adequately sized supply lines between the pump assembly 60 and the motors 64, 64', the system is much less susceptible to a free-wheeling or runaway condition than conventional power buggies. Free wheeling risk is reduced by a implementing a number of features into the system, some of which are described above. For instance: Elimination of the neutral position on the directional control valve 72 assures that the motors 64, 64' are always effectively coupled to the hydrostatic pump 94.

The charge pressure, determined by the relief valve 174, is increased to make sure the main system loop always has an adequate make up supply of hydraulic fluid. In a preferred embodiment, the valve 174 is set to provide a maximum pressure of about 300–380 psi. In prior systems powered by the Eaton axial piston pump, the charge pressure delivered by the pump ranges from 30–50 psi.

The diameters of the lines 120, 124, etc., coupling the pump 94 to the motors 64, 64' are increased relative to prior art systems to reduce power loss and reduce potential for cavitation. In a preferred embodiment, all lines are of a ¾ inside diameter, as opposed to ½ in prior systems.

The flow rate of hydraulic fluid through the wheel motors 64, 64' is balanced with the fluid flow rate through the pump 94 under all operating conditions.

A fully-loaded machine configured as described above does not free wheel when traveling down an incline of at least 15%, and even down an incline of 20%. In contrast, other known fully-loaded power buggies, such as the Whiteman power buggy described above, free wheel when traveling down inclines of 10% to 15%.

The system as described above also has other desirable characteristics. For instance, the system experiences only 0.04 hp of power loss through 10' of ¾ inside diameter hydraulic lines, as opposed to 0.40 hp power loss in a standard system having ½ lines. Moreover, despite the fact that the wheel drive motors 64, 64' are balanced with the hydrostatic pump 94, the pump 94 still has a maximum flow rate of 16 gpm at a 1000 psi pump output pressure, which is very near the 17.7 gpm flow rate provided by a standard system at the same output pressure.

Many changes and modifications could be made to the invention without departing from the spirit thereof. The scope of some of those changes is discussed above. The scope of other changes will become apparent from the appended claims.

We claim:
1. A power buggy comprising:
(A) a plurality of wheels;
(B) a movable chassis which is supported on the wheels;
(C) a dumpable article support which is supported on the chassis;
(D) an operator's handle which is designed to be grasped by an operator's left and right hands;
(E) a directional control switch which can be selectively manually actuated to change direction of travel of the power buggy;
(F) a kill switch which can be selectively manually actuated to shut off the power buggy; and
(G) a dump switch which can be selectively manually actuated to dump the dumpable article support, wherein the directional control switch, the kill switch, and the dump switch are positioned such that they are all actuatable without releasing the operator's handle with either hand.

2. The power buggy as recited in claim 1, wherein the operator's handle comprises opposed handgrips, and wherein the directional control switch, the kill switch, and the dump switch are all positioned such that they are actuatable without releasing the handgrips with either hand.

3. A power buggy comprising:

(A) a plurality of wheels;

(B) a movable chassis which is supported on the wheels and which has front and rear end portions;

(C) a dumpable article support which is supported on the front end portion of the chassis;

(D) a pump assembly that supplies power to the wheels;

(E) an operator's handle which includes first and second handgrips designed to be grasped by an operator's hands; and (F) an electric directional control switch which is configured to change direction of travel of the power buggy, wherein the electric directional control switch has at least first and second positions, wherein one of the first and second position controls a forward direction and the other of the first and second positions controls a reverse direction of the power buggy.

4. The power buggy of claim 3, wherein said directional control switch comprises a two-position switch having only first and second positions, wherein one of the first and second positions controls a forward direction and the other of the first and second positions controls a reverse direction of the power buggy.

5. A method comprising:

(A) supplying motive power to at least one drive wheel of a power buggy to propel the power buggy;

(B) steering the power buggy by placing left and right hands on spaced portions of an operator's handle of the power buggy;

(C) dumping an article support of the power buggy by manipulating a dump switch without releasing the operator's handle with either hand;

(D) changing a direction of power buggy travel from forward to reverse by manipulating a directional control switch without releasing the operator's handle with either hand; and (E) shutting off the power buggy by manipulating a kill control switch without releasing the operator's handle with either hand.

6. The method as recited in claim 5, wherein the steering step is performed by gripping opposed handgrips of the operator's handle, and wherein the dumping, changing, and shutting off steps are all performed without releasing a handgrip with either hand.

7. A method comprising:

(A) supplying motive power to at least one drive wheel of a power buggy to propel the power buggy; and (B) during the supplying step, changing a direction of power buggy travel from forward to reverse by actuating a two-position directional control switch having only a forward position and a reverse position.

8. A power buggy comprising:

(A) a plurality of wheels;

(B) a movable chassis which is supported on the wheels and which has front and rear end portions;

(C) a dumpable article support which is supported on the front end portion of the chassis;

(D) a pump assembly that supplies power to the wheels;

(E) an operator's handle which includes first and second handgrips designed to be grasped by an operator's hands; and (F) a single electric directional control switch which is configured to change direction of travel of the power buggy, wherein the electric directional control switch has only first and second positions, wherein one of the first and second position controls a forward direction and the other of the first and second positions controls a reverse direction of the power buggy, and wherein said directional control switch is the only directional control device for said power buggy.

9. A power buggy comprising:

(A) a plurality of wheels;

(B) a movable chassis which is supported on the wheels and which has front and rear end portions;

(C) a dumpable article support which is supported on the front end portion of the chassis;

(D) a pump assembly that supplies power to the wheels;

(E) an operator's handle which includes first and second handgrips designed to be grasped by an operator's hands;

(F) a squeeze lever which, when actuated, causes the power buggy to propel itself in a selected direction from a stationary position thereof;

(G) a single electric directional control switch, wherein the electric directional control switch has only first and second positions, wherein selection of one of the first and second positions causes the power buggy to propel itself in a forward direction upon actuation of the squeeze lever and selection of the other of the first and second positions causes the power buggy to propel itself in a reverse direction upon actuation of the squeeze lever;

(H) a kill switch which can be selectively manually actuated to shut off the power buggy; and (I) a dump switch which can be selectively manually actuated to dump the dumpable article support, wherein the directional control switch, the squeeze lever, the kill switch, and the dump switch are positioned such that they can all be operated without releasing the operator's handle with either hand.

10. A power buggy comprising:

(A) a plurality of wheels;

(B) a movable chassis which is supported on the wheels and which has front and rear end portions;

(C) a dumpable article support which is supported on the front end portion of the chassis;

(D) a pump assembly that supplies power to the wheels;

(E) an operator's handle which includes first and second handgrips designed to be grasped by an operator's hands; and (F) an electric directional control switch which is configured to change direction of travel of the power buggy, wherein the electric directional control switch comprises a two-position switch having only first and second positions, wherein one of the first and second positions controls a forward direction and the other of the first and second positions controls a reverse direction of the power buggy.

11. A power buggy comprising:

(A) a plurality of wheels;

(B) a movable chassis which is supported on the wheels and which has front and rear end portions;

(C) a dumpable article support which is supported on the front end portion of the chassis;

(D) a pump assembly which supplies power to the wheels and which charges a hydraulic system of the power buggy;

(E) an operator's handle which includes first and second handgrips designed to be grasped by an operator's hands;

(F) a directional control switch which can be selectively manually actuated to change direction of travel of the power buggy;

(G) a kill switch which can be selectively manually actuated to shut off the power buggy; and (H) a dump switch which can be selectively manually actuated to dump the dumpable article support, wherein the directional control switch, the kill switch, and the dump switch are all actuatable without releasing the handgrips with either hand.

12. A power buggy comprising:

(A) a plurality of wheels;

(B) a movable chassis which is supported on the wheels and which has front and rear end portions;

(C) a dumpable article support which is supported on the front end portion of the chassis;

(D) a pump assembly that supplies power to the wheels;

(E) an operator's handle which includes first and second handgrips designed to be grasped by an operator's hands;

(F) a squeeze lever which, when actuated, causes the power buggy to propel itself in a selected direction from a stationary position thereof; and (G) a single electric directional control switch, wherein the electric directional control switch has only first and second positions, wherein selection of one of the first and second positions causes the power buggy to propel itself in a forward direction upon actuation of the squeeze lever and selection of the other of the first and second positions causes the power buggy to propel itself in a reverse direction upon actuation of the squeeze lever.

13. The power buggy as recited in claim 12, wherein the directional control switch and the squeeze lever are positioned such that they can both be operated without releasing the operator's handle with either hand.

14. The power buggy s recited in claim 13, further comprising a kill switch which can be selectively manually actuated to shut off the power buggy, and a dump switch which can be selectively manually actuated to dump the dumpable article support, wherein the kill switch and the dump switch are positioned such that they are both actuatable without releasing the operator's handle with either hand.

15. The power buggy as recited in claim 12, wherein the squeeze lever includes (1) a pivot portion that includes (a) a free end that is pivotally mounted on a handgrip of the power buggy, and (b) first and second legs that extend at converging angles from the free end and the lever portion, respectively, and that are joined to one another at a corner of the pivot portion, (2) a lever portion, and (3) a cable mount that is spaced from the free end and from the lever portion, wherein actuation of the squeeze lever propels the power buggy at a speed that is dependent upon the magnitude of squeeze lever pivoting, wherein the cable mount and the end of lever portion are spaced apart at a distance of from about 5" to 7" .

16. An operator's handle designed for use on a power buggy, the handle comprising:

(A) first and second handgrips which are designed to be grasped by an operator's hands;

(B) a squeeze lever which includes (1) a pivot portion that includes (a) a free end that is pivotally mounted on a handgrip of the power buggy, and (b) first and second legs that extend at converging angles from the free end and the lever portion, respectively, and that are joined to one another at a corner of the pivot portion, (2) a lever portion, and (3) a cable mount that is spaced from the free end and from the lever portion, wherein actuation of the squeeze lever propels the power buggy at a speed that is dependent upon the magnitude of squeeze lever pivoting, wherein the cable mount and the end of lever portion are spaced apart at a distance of from about 5" to 7".

17. The handle of claim 16, wherein the cable mount and the end of lever portion are spaced apart at a distance of about 5.5".

18. The handle of claim 16, wherein the free end and the cable mount are spaced apart at a distance of about 1.5".

19. The handle of claim 18, wherein the lever portion is about 4" long.

20. The handle of claim 19, wherein the entire lever, measured from the pivot mount to the end of the lever portion, is about 6" long.

* * * * *